(12) United States Patent
Bhogal et al.

(10) Patent No.: US 8,649,970 B2
(45) Date of Patent: Feb. 11, 2014

(54) PROVIDING POPULAR GLOBAL POSITIONING SATELLITE (GPS) ROUTES

(75) Inventors: Kulvir S. Bhogal, Pflugerville, TX (US);
Robert Ross Peterson, Austin, TX (US);
Lisa Seacat DeLuca, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 859 days.

(21) Appl. No.: 12/265,915

(22) Filed: Nov. 6, 2008

(65) Prior Publication Data

US 2010/0114485 A1 May 6, 2010

(51) Int. Cl.
*G01C 21/00* (2006.01)
*G08G 1/123* (2006.01)

(52) U.S. Cl.
USPC ........... 701/410; 701/400; 701/408; 701/420; 701/421; 701/425; 340/988; 340/990; 340/991; 340/993; 340/995.1; 340/995.13; 340/995.19; 340/995.22; 340/995.23

(58) Field of Classification Search
USPC ............. 701/1, 117–119, 200–202, 206–210, 701/213, 400, 408, 410, 420, 421, 425; 340/988, 990, 991, 993, 995.1, 995.13, 340/995.19, 995.22, 995.23
See application file for complete search history.

(56) References Cited

U.S. PATENT DOCUMENTS

| | | | |
|---|---|---|---|
| 6,973,384 B2* | 12/2005 | Zhao et al. ................ | 701/117 |
| 7,146,273 B2* | 12/2006 | Kadono et al. ............. | 701/208 |
| 7,203,598 B1 | 4/2007 | Whitsell | |
| 7,289,904 B2* | 10/2007 | Uyeki ........................ | 701/209 |
| 7,376,509 B2* | 5/2008 | Endo et al. ................ | 701/209 |
| 7,440,842 B1* | 10/2008 | Vorona ...................... | 701/117 |
| 2001/0029425 A1 | 10/2001 | Myr | |
| 2002/0026289 A1* | 2/2002 | Kuzunuki et al. .......... | 702/150 |
| 2003/0009277 A1* | 1/2003 | Fan et al. ................... | 701/117 |
| 2005/0209772 A1* | 9/2005 | Yoshikawa et al. ........ | 701/200 |
| 2006/0038704 A1 | 2/2006 | Poltorak | |
| 2007/0073480 A1* | 3/2007 | Singh ......................... | 701/211 |
| 2008/0294337 A1* | 11/2008 | Dawson et al. ............ | 701/209 |
| 2009/0088971 A1* | 4/2009 | Currie et al. .............. | 701/209 |

\* cited by examiner

*Primary Examiner* — John Q Nguyen
*Assistant Examiner* — Chuong Nguyen
(74) *Attorney, Agent, or Firm* — Yudell Isidore Ng Russell PLLC

(57) ABSTRACT

A method, system, and computer program product for providing popular routes via a global positioning satellite (GPS) system. A GPS device receives a route request from a user. The GPS device then determines a current location of the GPS device and connects to a network server. In response to connecting to the network server, the GPS device transmits a route selection request to the network server. In response, the GPS device receives a route selection list from the network server where the route selection list contains a plurality of routes previously taken by other drivers. Each route is assigned a popularity rating. The GPS device displays one or more of the routes of the route selection list, and requests that a user select a route. After the user selects a route the GPS device displays the selected route as an overlay on a map display.

18 Claims, 4 Drawing Sheets

PROVIDING POPULAR GLOBAL POSITIONING SATELLITE (GPS) ROUTES

BACKGROUND OF THE INVENTION

1. Technical Field

The present invention relates in general to global positioning system (GPS) devices. Still more particularly, the present invention relates to receiving GPS routes from a network server, wherein the GPS routes provide popularity rating information.

2. Description of the Related Art

GPS devices use algorithms to provide route information from one point to another. Unfortunately, many times these routes may not be the optimal route. In many cases, the GPS user or correspondents of the GPS user may be able to provide alternate routes for a trip that better suit the needs of the user.

SUMMARY OF THE INVENTION

Disclosed is a method, system, and computer program product for providing popular global positioning satellite (GPS) routes via a GPS system. A GPS device receives a route request from a user. The GPS device then determines a current location of the GPS device and connects to a network server. In response to connecting to the network server, the GPS device transmits a route selection request to the network server. In response, the GPS device receives a route selection list from the network server where the route selection list contains a plurality of routes previously taken by other drivers. Each route is assigned a popularity rating. The GPS device displays one or more of the routes of the route selection list, and requests that a user select a route. After the user selects a route, the GPS device displays the selected route as an overlay on a map display.

The above features of the present invention will become apparent in the following detailed written description.

BRIEF DESCRIPTION OF THE DRAWINGS

The novel features believed characteristic of the invention are set forth in the appended claims. The invention itself, however, will best be understood by reference to the following detailed descriptions of an illustrative embodiment when read in conjunction with the accompanying drawings, wherein:

DETAILED DESCRIPTION OF THE PREFERRED EMBODIMENT

The illustrative embodiments provide a method, system, and computer program product for providing popular global positioning satellite (GPS) routes, in accordance with one embodiment of the invention.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

Figure 1:
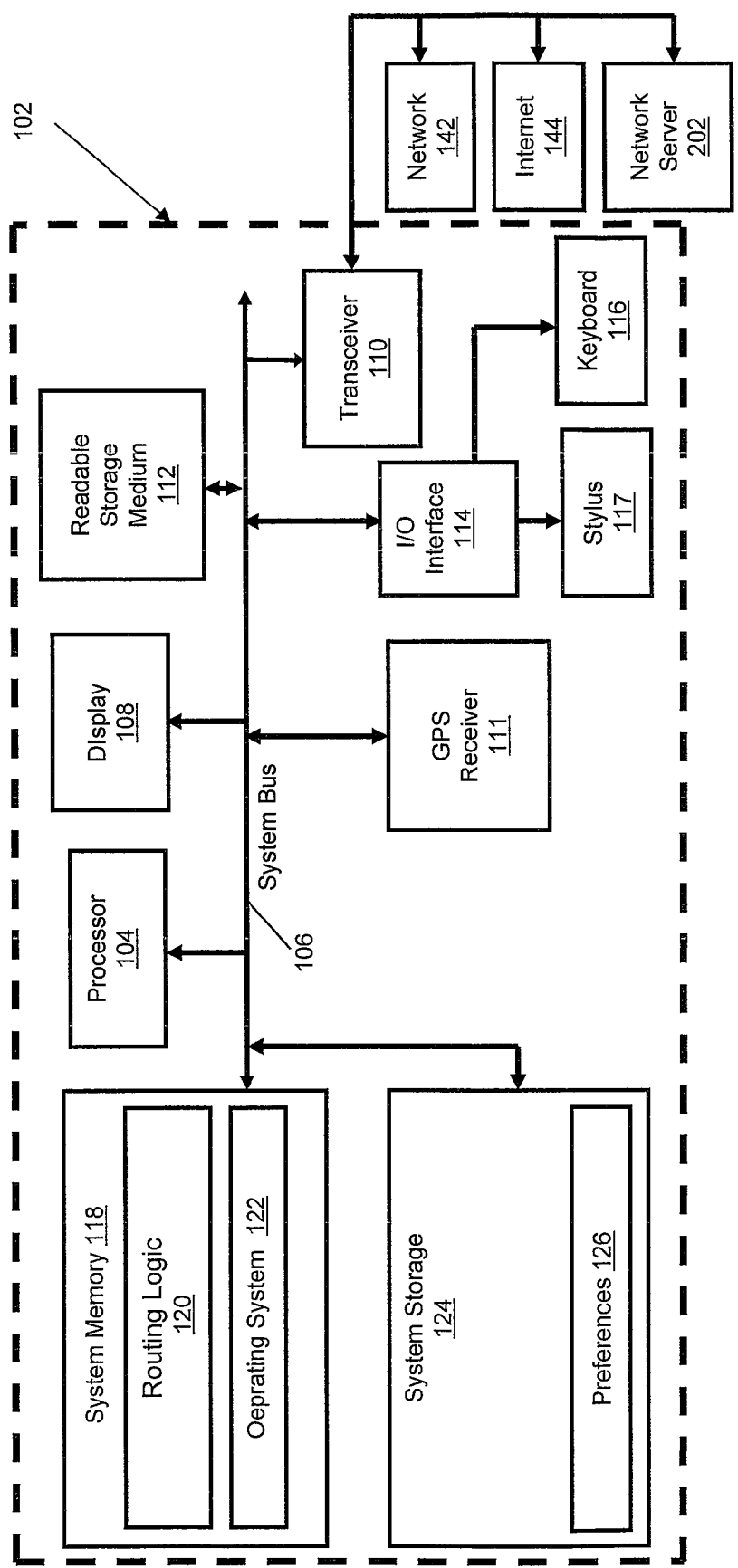
FIG. 1 is a block diagram of a global positioning satellite (GPS) device in which the present invention may be implemented.

With reference now to FIG. 1, there is depicted a block diagram of a Global Positioning Satellite (GPS) Device 102 in which the present invention may be implemented. GPS Device 102 includes a processor 104 and a display 108 that is coupled to a system bus 106. Display 108 may be a touchscreen display or a display configured to receive input via human touch or a pointing device (e.g., stylus 117). A transceiver 110, connected to system bus 106, enables GPS Device 102 to connect to network 142, an internet 144, and a network server 202. GPS Device 102 may also receive satellite transmissions via a GPS receiver 111. System bus 106 also affords communication with a hardware-based readable storage medium 112 (e.g., Compact Disk-Read Only Memory (CD-ROM), flash drive memory, etc). Input/Output (I/O) Interface 114, also connected to system bus 106, permits user interaction with GPS Device 102, such as data entry via keyboard 116 or stylus 117.

GPS Device 102 also comprises system memory 118, which is connected to system bus 106. As shown, system memory 118 also comprises routing logic 120 and operating system 122. Routing logic 120 includes code for implementing the processes described in FIGS. 2-4. In one embodiment, routing logic 120 may request a route selection list from network server 202, as described in greater detail below in FIGS. 2-4.

GPS Device 102 also comprises a system storage 124, which is connected to system bus 106. System Storage 124 comprises preferences 126. Preferences 126 may contain route history information and user defined preferences for requesting a route selection list.

As illustrated and described herein, GPS Device 102 may be a personal computer, server, or data processing service having the required hardware components and programmed with routing logic 120, executing on the processor to provide the functionality of the invention. The hardware elements depicted in computer 102 are not intended to be exhaustive, but rather are representative to highlight essential components required by and/or utilized to implement the present invention. For instance, computer 102 may include alternate memory storage devices such as magnetic cassettes, Digital Versatile Disks (DVDs), Bernoulli cartridges, and the like. These alternate configurations of components and other variations are intended to be within the spirit and scope of the present invention.

Figure 2:
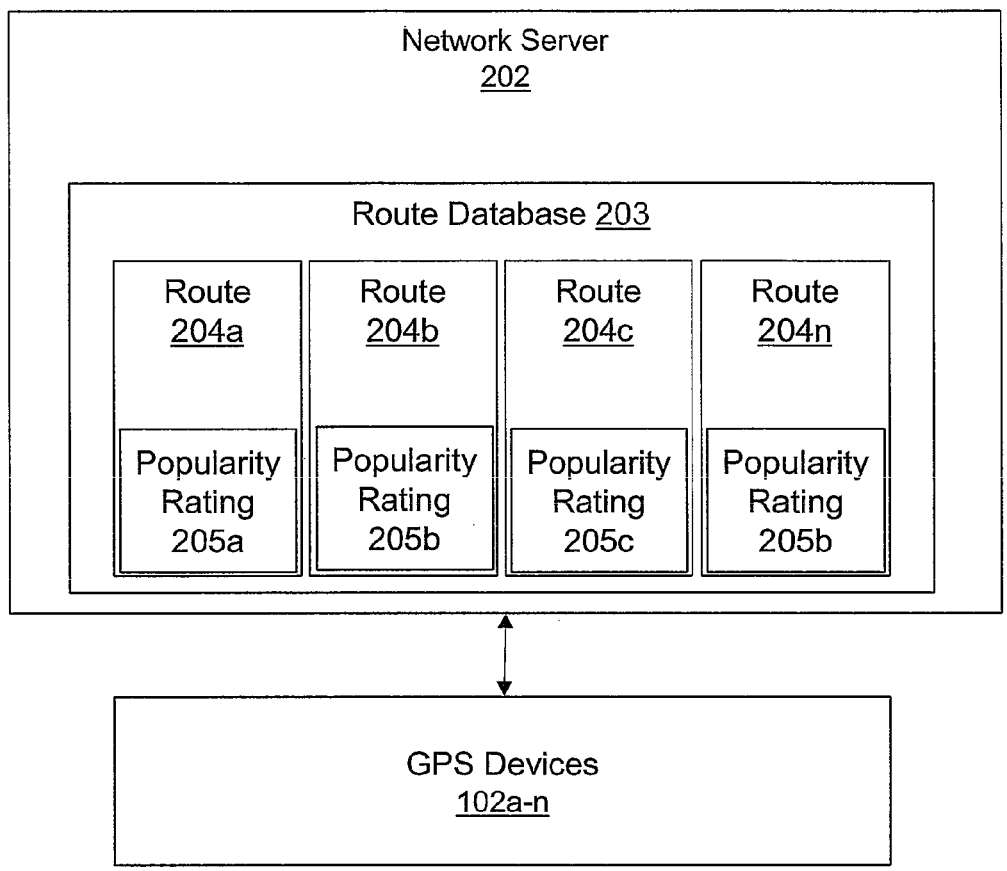
FIG. 2. is a block diagram of an exemplary system for providing popular global positioning satellite (GPS) routes.

With reference now to FIG. 2, a block diagram of an exemplary system for providing popular global positioning satellite (GPS) routes according to one embodiment of the invention, is presented.

GPS device 102 receives a route request from a user. The route request contains a location of a desired destination. In response to receiving the route request, GPS device 102 determines its current location. The current location may be determined by such methods as interpreting satellite location data or triangulating a location using a cellular network. After determining the current location GPS Device 102 connects to network server 202. GPS Device 102 transmits a route selection request to the network server 202. The route selection request contains the current location of GPS Device 102 and the desired destination specified by the user of GPS Device 102. Network server 202 contains a route database 203. Route database 203 contains listings of several routes 204a-n. Routes 204a-n may comprise of preconfigured routes and routes taken by other users. Each route 204a-n contains a popularity rating 205a-n corresponding to that particular route 204a-n. A popularity rating 205a-n is derived from a calculation of a number of users taking a particular route 204a-n versus the number of users for which a particular route 204a-n has been transmitted to. In an alternate embodiment a popularity rating 205 may be derived from votes received for a particular route from GPS devices 102a-n. A popularity rating may be presented as numerical value (e.g., a percentage value, or score), a letter rating (e.g. A+ through F), or a graphical score (e.g., 1-4 stars). Network server 202 determines a plurality of routes 204a-n for traveling from the current location of GPS Device 102 to the desired destination. Network server 202 then transmits a route selection list to GPS Device 102.

In response to receiving the route selection list, GPS Device 102 displays one or more of the received routes 204a-n on a display (e.g., Display 108, FIG. 1) of GPS Device 102. The popularity rating 205a-b is also displayed for each route 204a-n currently being displayed. GPS Device 102 may then request that a user select one of the displayed routes 204a-n. In response to receiving a selected route 204 GPS Device 102 displays the selected route as an overlay on a display.

During transit from the current location to the desired destination, routing logic 120 may monitor driving patterns of the driver and the actual route taken by the driver relative to the selected route 204a-n. When routing logic 120 determines that the GPS Device 102 has arrived at the desired destination, routing logic 120 may autonomously transmit a route data packet to the network server. The route data packet may contain the selected route 204a-n, the actual route taken by the GPS Device 102, and data of driving patterns monitored by routing logic 120 during transit from the starting location to the destination location.

In an alternate embodiment, network server 202 may be a peer-to-peer network system. In this embodiment, received route data packets may be used to calculate new routes 204a-n or refine popularity ratings or route data based on actual routes taken by GPS Devices 102a-n. In this embodiment GPS Devices 102a-n may share user created routes via network server 202. In another embodiment, GPS device 102 may also allow for route information to be provided via an internet website that provides direction information The display of GPS Device 102 may also contain tactile input technology to receive input via a stylus directly on the display. This may enable a user to manually draw a route on the display, or modify a route received from network server 202. In response to receiving a modified route from a user, GPS device 102a may update the selected route to incorporate the route modification. Modified routes may also be transmitted to network server 202. Network server 202 may then subsequently transmit modified routes to other GPS Devices 120b-n.

Figure 3:
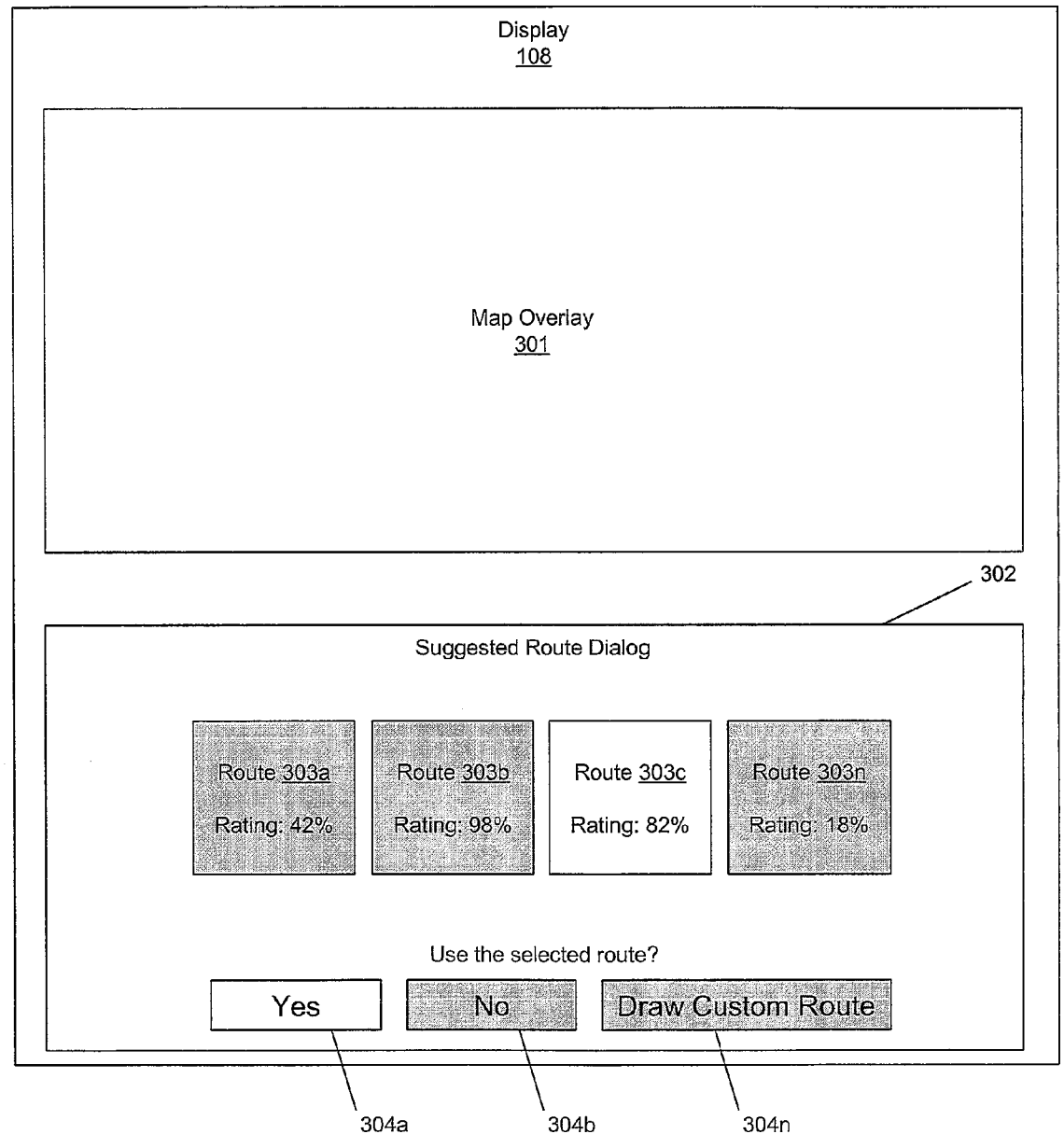
FIG. 3. is a diagram of an exemplary user interface for selecting a GPS route.

With reference now to FIG. 3, there is illustrated an exemplary user interface for selecting a GPS route, in accordance with one embodiment of the invention. In this illustration a map overlay 301 may be presented on a display (e.g., Display 108, FIG. 1) of GPS Device 102. The map overlay 301 may display a currently highlighted or selected route of suggested route dialog 302. Suggested Route Dialog 302 contains route selections 302a-n corresponding to routes of a received route selection list. A user may select a route selection 302a-n as desired. Each route selection 302a-n displays a popularity rating of the corresponding route. Additionally, Suggested Route Dialog 302 may have a confirmation area with response selection boxes 304a-n to facilitate allowing a user to confirm or reject a currently selected/highlighted route or draw a custom route on map overlay 301.

Figure 4:
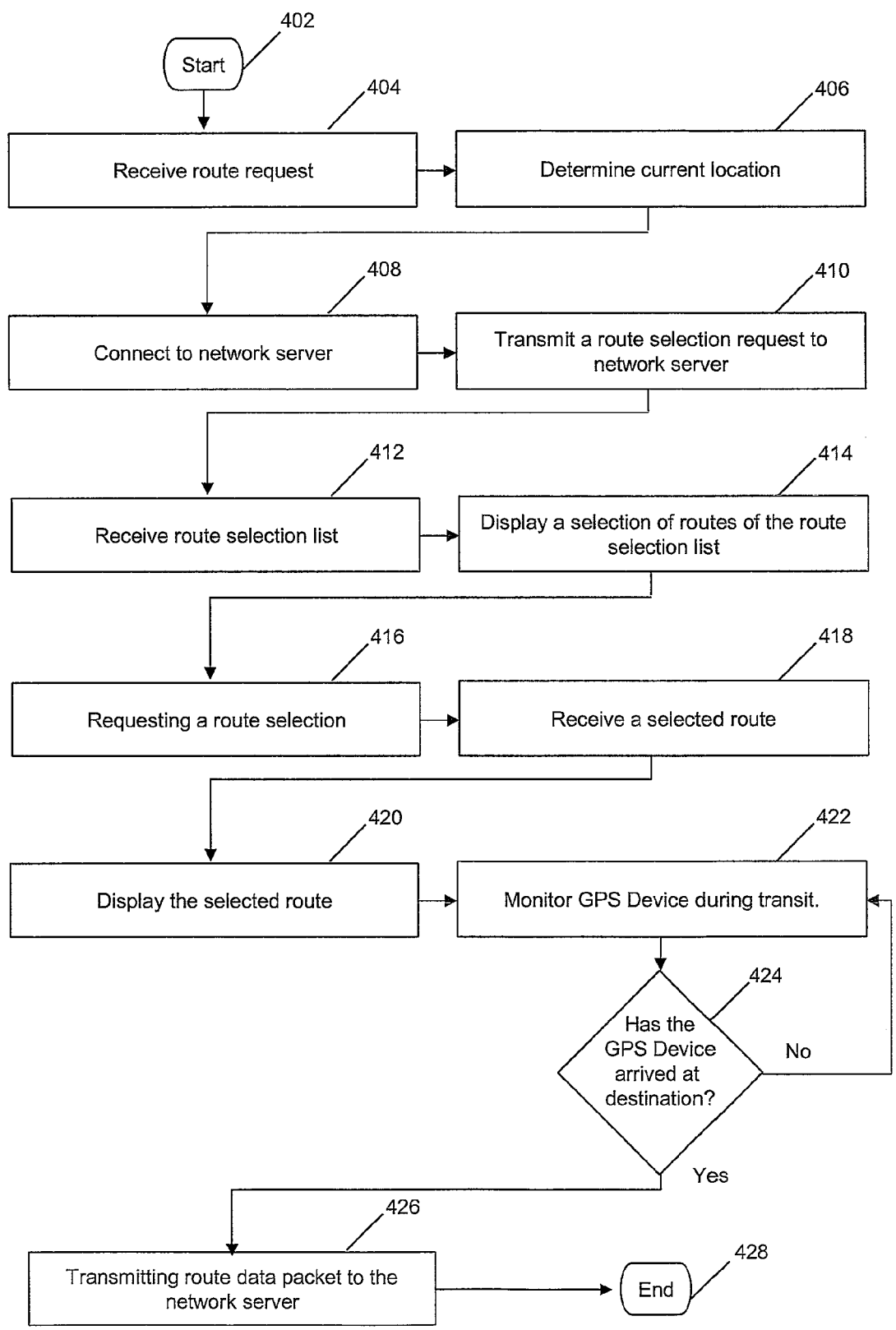
FIG. 4. is a high-level logical flowchart of an exemplary method for providing popular global positioning satellite (GPS) routes.

With reference now to FIG. 4, a high-level logical flowchart of an exemplary method for providing popular global positioning satellite (GPS) routes, is presented. After initiator block 402, the GPS Device receives a route request containing the desired destination from a user (block 404). The GPS device then determines the current location (block 406). The GPS Device then connects to a network server (block 408) and transmits a route selection request containing the current location and the desired destination (block 410).

Subsequently, the GPS device receives a route selection list from the network server (block 412). The route selection list contains a plurality of routes for travelling from the current location to the desired destination. Each route is also assigned a popularity rating. The GPS device then displays a selection of the routes while also displaying the popularity rating of each displayed route (block 414). The GPS device also requests a route selection by a user (block 416). Upon receiving a selected route (block 418), the GPS device displays the selected route as a map overlay on the display (block 420). During transit towards the desired destination the GPS device monitors driving patterns and the actual route taken towards the destination (block 422).

At block 424 a determination is made if the GPS device has arrived at the desired destination. If it is determined that the GPS device has not yet arrived at the desired destination the GPS device will continue to monitor driving patterns and the actual route taken towards the destination. If it is determined that the GPS device has arrived at the desired destination, the GPS device transmits a route data packet to the network server (block 426). The route data packet contains driving patterns during transit, the actual route taken towards the destination, and the selected route. The process then ends at terminator block 428.

In the flow charts above, one or more of the methods are embodied in microcode such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

Although aspects of the present invention have been described with respect to a computer processor and program application/logic, it should be understood that at least some aspects of the present invention may alternatively be implemented as a program product for use with a data storage system or computer system. Programs defining functions of the present invention can be delivered to a data storage system or computer system via a variety of signal-bearing media, which include, without limitation, non-writable storage media (e.g. CD-ROM), writable storage media (e.g. a floppy diskette, hard disk drive, read/write CD-ROM, optical media), and communication media, such as computer and telephone networks including Ethernet. It should be understood, therefore, that such signal-bearing media, when carrying or encoding computer readable instructions that direct method functions of the present invention, represent alternative embodiments of the present invention. Further, it is understood that the present invention may be implemented by a system having means in the form of hardware, software, or a combination of software and hardware as described herein or their equivalent.

Having thus described the invention of the present application in detail and by reference to illustrative embodiments thereof, it will be apparent that modifications and variations are possible without departing from the scope of the invention defined in the appended claims. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for providing popular routes via a global positioning satellite (GPS) system, the method comprising:
   receiving, at the GPS system, a route request that contains a desired destination;
   determining, via the GPS system, a current location;
   connecting to a network server that contains a plurality of routes stored in a route database;
   in response to connecting to the network server, transmitting a route selection request that contains the current location and the desired destination;
   receiving a route selection list, wherein the route selection list contains a plurality of routes previously taken by other drivers, and wherein each particular route is assigned a popularity rating that is derived from a calculation of a number of users taking the particular route versus the number of users for which the particular route has been transmitted to;
   displaying one or more of the routes of the route selection list on a display along with a corresponding popularity rating of each particular route, wherein the popularity rating of each displayed route is viewable on the display;
   requesting a selection of one of the displayed routes as a selected route;
   in response to receiving the selected route, displaying the selected route as an overlay on a map display.

2. The method of claim 1, wherein the popularity rating is presented as one of (a) a numerical value, (b) a letter rating, and (c) a graphical score.

3. The method of claim 2, wherein the numerical value is one of a percentage value and a score.

4. The method of claim 2, wherein the graphical score is presented as a number of stars, with a larger number of stars indicating a higher score.

5. The method of claim 1, further comprising:
   monitoring driving patterns during transit of the GPS device;
   monitoring an actual route taken by the GPS device; and
   in response to determining that the GPS device has arrived at the destination, transmitting a route data packet to the network server, wherein the route data packet includes the selected route, the actual route taken, and the driving patterns during transit and the route data packet is utilized at the network server to perform at least one of (a) calculate new routes and (b) refine popularity ratings and route data based on actual routes taken by the GPS device and other GPS devices.

6. The method of claim 1, wherein the display is configured to receive tactile input and the method further comprises:
   requesting a user provided route modification via a tactile input directly on the display;
   in response to receiving the user provided route modification, wherein the user manually draws a route on the display and modifies the route received from the network server:
      updating the displayed selected route to incorporate the route modification; and
      transmitting the user provided route modification to the network server.

7. A device for providing popular routes via a global positioning satellite (GPS) system, the device comprising:
   a processor; and
   a utility having code that executes on the processor to cause the device to:
      receive, at the GPS system, a route request that contains a desired destination;
      determine, via the GPS system, a current location;
      connect to a network server that contains a plurality of routes stored in a route database;
      in response to connecting to the network server, transmit a route selection request that contains the current location and the desired destination;
      receive a route selection list, wherein the route selection list contains a plurality of routes previously taken by other drivers, and wherein each particular route is assigned a popularity rating that is derived from a calculation of a number of users taking the particular route versus the number of users for which the particular route has been transmitted to;
      display one or more of the routes of the route selection list on a display along with a corresponding popularity rating of each particular route, wherein the popularity rating of each displayed route is viewable on the display;
      request a selection of one of the displayed routes as a selected route;
      in response to receiving the selected route, display the selected route as an overlay on a map display.

8. The device of claim 7, wherein the popularity rating is presented as one of (a) a numerical value, (b) a letter rating, and (c) a graphical score.

9. The device of claim 8, wherein the numerical value is one of a percentage value and a score.

10. The device of claim 8, wherein the graphical score is presented as a number of stars, with a larger number of stars indicating a higher score.

11. The device of claim 7, wherein the utility further comprises code that executes on the processor to cause the device to:
    monitor driving patterns during transit of the GPS device;
    monitor an actual route taken by the GPS device; and
    in response to determining that the GPS device has arrived at the destination, transmit a route data packet to the network server, wherein the route data packet includes the selected route, the actual route taken, and the driving patterns during transit and the route data packet is utilized at the network server to perform at least one of (a) calculate new routes and (b) refine popularity ratings and route data based on actual routes taken by the GPS device and other GPS devices.

12. The device of claim 7, further comprising:
a display that is configured to receive tactile input; and
wherein the utility further comprises code that causes the device to:
generate a request for a user provided route modification via a tactile input;
in response to receiving the user provided route modification, wherein the user manually draws a route on the display and modifies the route received from the network server: update the displayed selected route to incorporate the route modification; and
transmit the user provided route modification to the network server.

13. A computer program product for providing popular routes via a global positioning satellite (GPS) system, the computer program product comprising:
a computer readable device; and
program code on the computer readable device that when executed by within a GPS device configures the GPS device to perform the functions of:
receiving, at the GPS system, a route request that contains a desired destination;
determining, via the GPS system, a current location;
connecting to a network server that contains a plurality of routes stored in a route database;
in response to connecting to the network server, transmitting a route selection request that contains the current location and the desired destination;
receiving a route selection list, wherein the route selection list contains a plurality of routes previously taken by other drivers, and wherein each particular route is assigned a popularity rating that is derived from a calculation of a number of users taking the particular route versus the number of users for which the particular route has been transmitted to;
displaying one or more of the routes of the route selection list on a display along with a corresponding popularity rating of each particular route, wherein the popularity rating of each displayed route is viewable on the display;
requesting a selection of one of the displayed routes as a selected route;
in response to receiving the selected route, displaying the selected route as an overlay on a map display.

14. The computer program product of claim 13, wherein the popularity rating is presented as one of (a) a numerical value, (b) a letter rating, and (c) a graphical score.

15. The computer program product of claim 14, wherein the numerical value is one of a percentage value and a score.

16. The computer program product of claim 14, wherein the graphical score is presented as a number of stars, with a larger number of stars indicating a higher score.

17. The computer program product of claim 13, wherein the program code further comprising code that configures the GPS device to perform the functions of:
monitoring driving patterns during transit of the GPS device;
monitoring an actual route taken by the GPS device; and
in response to determining that the GPS device has arrived at the destination, transmitting a route data packet to the network server, wherein the route data packet includes the selected route, the actual route taken, and the driving patterns during transit and the route data packet is utilized at the network server to perform at least one of (a) calculate new routes and (b) refine popularity ratings and route data based on actual routes taken by the GPS device and other GPS devices.

18. The computer program product of claim 13, wherein the display is configured to receive tactile input and the program code further comprising code that configures the GPS device to perform the functions of
requesting a user provided route modification via a tactile input directly on the display;
in response to receiving the user provided route modification, wherein the user manually draws a route on the display and modifies the route received from the network server:
updating the displayed selected route to incorporate the route modification; and
transmitting the user provided route modification to the network server.

* * * * *